(12) United States Patent
Ishida et al.

(10) Patent No.: US 9,155,148 B2
(45) Date of Patent: Oct. 6, 2015

(54) LIGHT SOURCE DRIVE DEVICE, OPTICAL SCANNING DEVICE AND IMAGE FORMING APPARATUS

(75) Inventors: Masaaki Ishida, Kanagawa (JP); Atsufumi Omori, Kanagawa (JP); Hayato Fujita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 663 days.

(21) Appl. No.: 13/473,278

(22) Filed: May 16, 2012

(65) Prior Publication Data

US 2012/0293783 A1 Nov. 22, 2012

(30) Foreign Application Priority Data

May 20, 2011 (JP) ................................. 2011-113138

(51) Int. Cl.
| H05B 33/08 | (2006.01) |
| G03B 27/54 | (2006.01) |
| H04N 1/053 | (2006.01) |
| H04N 1/113 | (2006.01) |
| G02B 26/12 | (2006.01) |

(52) U.S. Cl.
CPC .......... *H05B 33/0824* (2013.01); *G02B 26/127* (2013.01); *G03B 27/54* (2013.01); *H04N 1/053* (2013.01); *H04N 1/1135* (2013.01); *H05B 33/0851* (2013.01); *H04N 2201/0471* (2013.01); *H04N 2201/04729* (2013.01); *H04N 2201/04732* (2013.01); *H04N 2201/04744* (2013.01); *H04N 2201/04774* (2013.01); *H04N 2201/04789* (2013.01)

(58) Field of Classification Search
CPC ........... H05B 33/0824; H05B 33/0851; G03B 27/54; H04N 1/053
USPC ................................................... 347/237, 247
See application file for complete search history.

(56) References Cited

U.S. PATENT DOCUMENTS

| 2008/0225106 A1* | 9/2008 | Omori et al. .................. 347/237 |
| 2008/0298842 A1 | 12/2008 | Ishida et al. |
| 2011/0199657 A1 | 8/2011 | Ishida et al. |
| 2011/0228037 A1* | 9/2011 | Omori et al. .................. 347/247 |
| 2012/0099165 A1 | 4/2012 | Omori et al. |

FOREIGN PATENT DOCUMENTS

JP 2010-068033 3/2010

* cited by examiner

*Primary Examiner* — Sarah Al Hashimi
(74) *Attorney, Agent, or Firm* — Oblon, McClelland, Maier & Neustadt, L.L.P.

(57) ABSTRACT

A light source drive device includes a first current source which provides a predetermined current to a light source corresponding to a predetermined light output, and a second current source which provides an overshoot current to the light source synchronized with the predetermined current. A processor is configured to set an overshoot time during which the overshoot current is provided to the light source. Further, an overshoot current is set which is applied to the light source. The overshoot time is set so that the overshoot time based on the rising of the predetermined current to when a light emission of the light source is detected.

11 Claims, 11 Drawing Sheets

LIGHT SOURCE DRIVE DEVICE, OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2011-113138 filed in Japan on May 20, 2011.

BACKGROUND OF THE INVENTION

1. Field of the Invention

An embodiment of the present invention relates to a light source drive device, an optical scanning device and an image forming apparatus.

2. Description of the Related Art

Technology is known in which a higher frequency component of a transmission signal is overshot based on an attenuation property of a transmission line (pre-emphasis). Japanese laid open 2010-068033 describes the pre-emphasis technology.

When a drive current, which is provided with a light source, is overshot to improve a light output response, the light source may be damaged by being provided with the overshot drive current.

SUMMARY OF THE INVENTION

The present invention may provide a light source drive circuit and an image forming apparatus which prevent the light source from being damaged and improve the light output response of the light source.

According to one aspect of the present invention, a light source drive device comprises a first current source which provides a predetermined current to a light source corresponding to a predetermined light output, a second current source which provides an overshoot current to the light source synchronized with a rising of the predetermined current, an overshoot time setting block that sets an overshoot time which the overshoot current is provided to the light source, an overshoot current setting block that sets an overshoot current which the overshoot current is provided to the light source. The overshoot time is set so that the overshoot time is smaller than a time from the rising of the predetermined current to a detection of a light emission of the light source.

According to one exemplary embodiment of the present invention may prevent the light source from being damaged and improve the response of light output.

DETAILED DESCRIPTION OF PREFERRED EMBODIMENTS

First Embodiment

According to the first embodiment, an overshoot time of a drive current is smaller than a time between a rising edge of the drive current and a detection of a light output of the light source.

Figure 1:
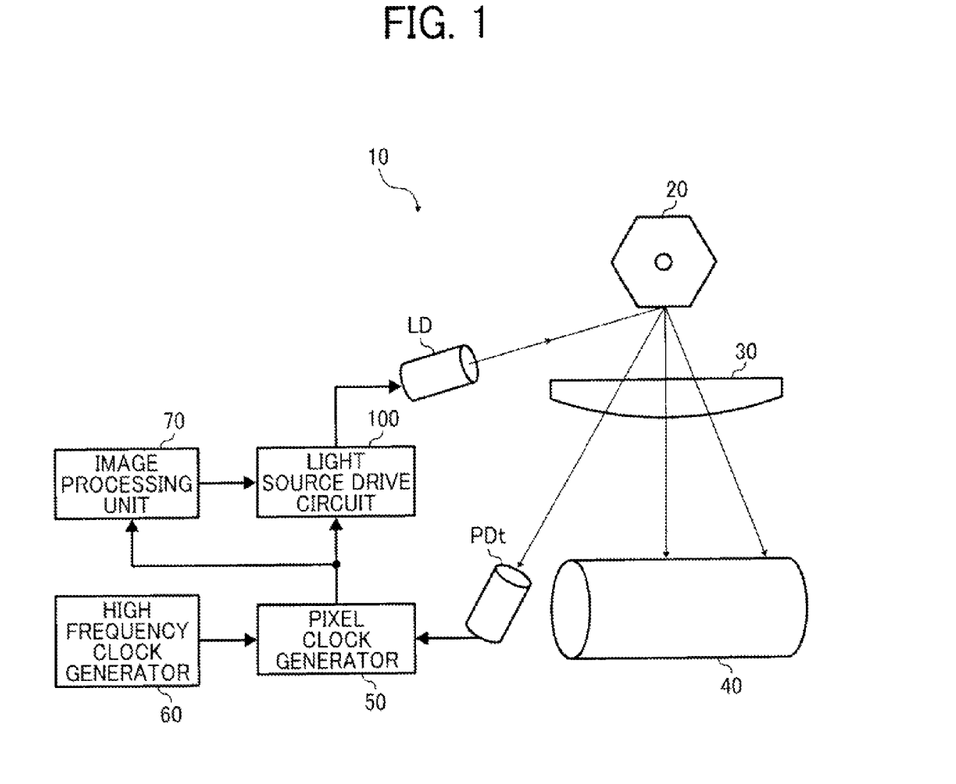
FIG. 1 is a schematic diagram illustrating an image forming apparatus of the first embodiment.

The first embodiment of the present invention is described with referring the figures. FIG. 1 illustrates a schematic configuration of an image forming apparatus 10.

The image forming apparatus 10 includes a rotatable polygon mirror 20 which is rotated by a motor, a scanning lens 30, a photosensitive drum 40, a pixel clock generator 50, a high frequency clock generator 60, an image processing unit 70, a light source drive circuit 100, a laser diode (LD) and a photo detector (PDt in FIG. 1).

A laser beam emitted from the LD is deflected by the polygon mirror 20, passed through the scanning lens 30 and irradiated on the photosensitive drum 40 as an object to be scanned. The laser beam on the photosensitive drum 40 forms a light spot and makes a latent image on the photosensitive drum 40. The polygon mirror 20 deflects the laser beam emitted from the LD toward the PDt every one scan. The PDt receives the laser beam deflected by the polygon mirror 20 and generates an electric signal. The PDt transmits the electric signal to the pixel clock generator 50 when the PDt receives the laser beam. The pixel clock generator 50 generates a pixel clock for scanning the photosensitive drum 40 according to the electric signal from the PDt. The high frequency clock generator 60 provides a high frequency clock to the pixel clock generator 50. The pixel clock generator 50 generates the pixel clock synchronized with the electric signal from the PDt.

The pixel clock generator 50 provides the pixel clock to the image processing unit 70 and the light source drive circuit 100. The image processing unit 70 provides a light emitting signal to the light source drive circuit 100 based on the pixel clock. The light source drive circuit 100 provides a drive current to the LD based on the pixel clock and the light emitting signal. Therefore, the latent image is formed on the photosensitive drum 40 corresponding to an image data. The image processing unit 70, the light source drive circuit 100, the clock generator 60, and/or the pixel clock generator 50 may be implemented as a processor, an integrated circuit such as an application specific integrated circuit, and/or a plurality of discrete circuit components connected to each other.

Figure 2:
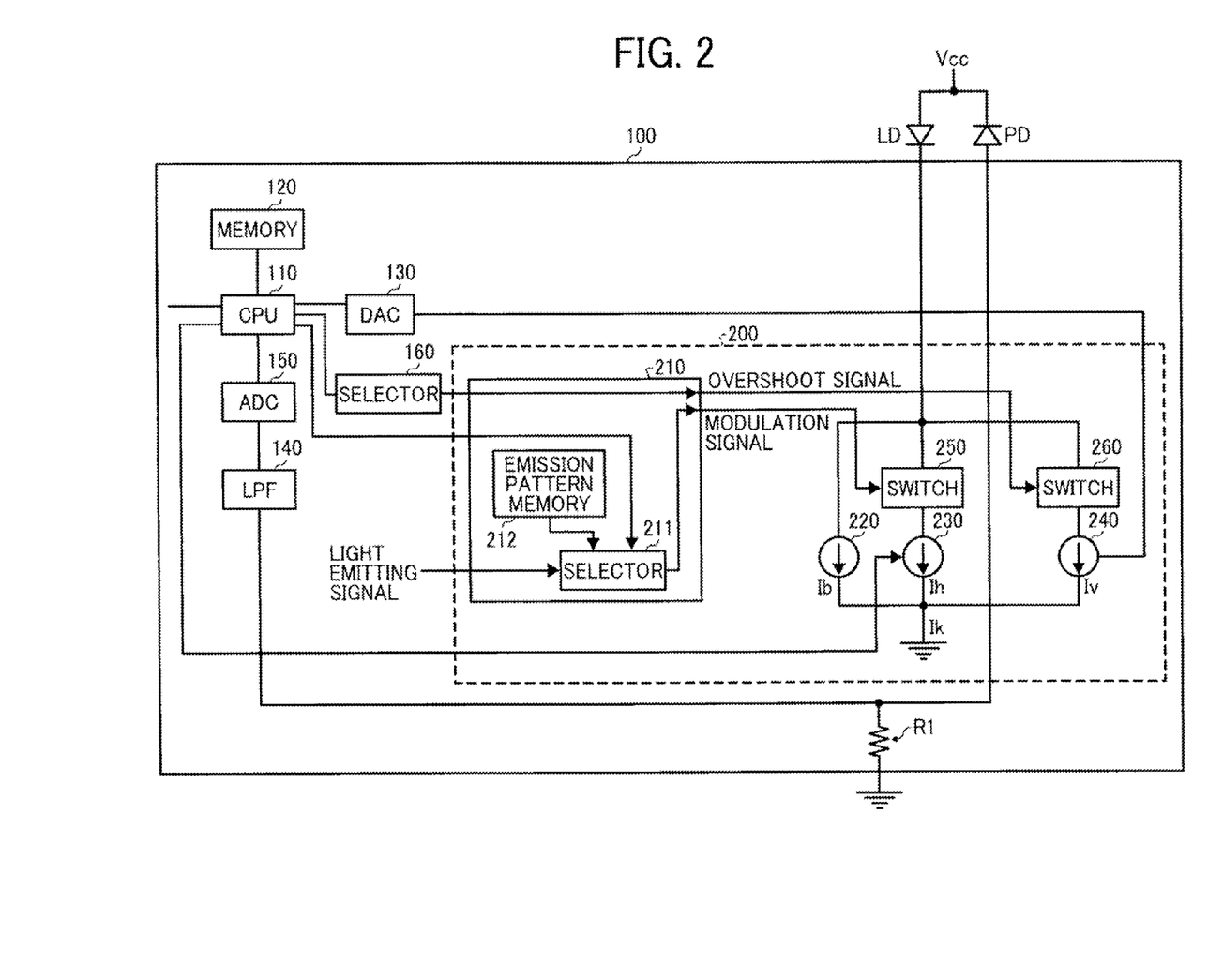
FIG. 2 is a schematic diagram illustrating a light source drive circuit of the first embodiment.

FIG. 2 illustrates a schematic of the light source drive circuit 100 according to the first embodiment of the present invention. The light source drive circuit 100 of the first embodiment includes a CPU (central processing unit) 110, a memory 120, a DAC (digital to analog convertor) 130, a LPF (low-pass filter) 140, an ADC (analog to digital convertor) 150, a selector 160, an LD driver 200 and a resistor R1.

The light source drive circuit 100 is connected to the LD (laser diode) and the PD (photo detector). A light power of the LD is controlled based on an electric signal, which corresponds to the light power of the LD, from the PD. The photo detector PD of FIG. 2 may be different from the photo detector PDt of FIG. 1, if desired. For example, the photo detector PD may be near, next to, or even be integrated with the laser diode LD. If desired, the photo detector PD can detect light directly from the laser diode LD without reflecting off the mirror 20.

The CPU 110 controls operations of the light source drive circuit 100. The memory 120 stores various kinds of data for the operations of the light source drive circuit 100. The DAC 130 converts a signal output from the CPU 110 to an analog signal. The LPF 140 passes a part of the electric signal, which has a predetermined frequency range, from the PD to the ADC 150. The ADC 150 converts a signal output from the LPF 140 to a digital signal. The selector 160 selects one of plural pulse signals based on a command of the CPU 110 and outputs the one of plural pulse signals to the LD driver 200. The one of plural pulse signals is used to calculate an overshoot time (Tov) as described below.

The light emitting signal and the pixel clock are input to the LD driver 200. The LD driver provides a drive current to the LD corresponding to the light emitting signal and the pixel clock. Therefore, an emission timing of the LD may be controlled. The LD driver 200 of the present embodiment may cause the drive current to overshoot. The LD driver 200 is described below.

Figure 3:
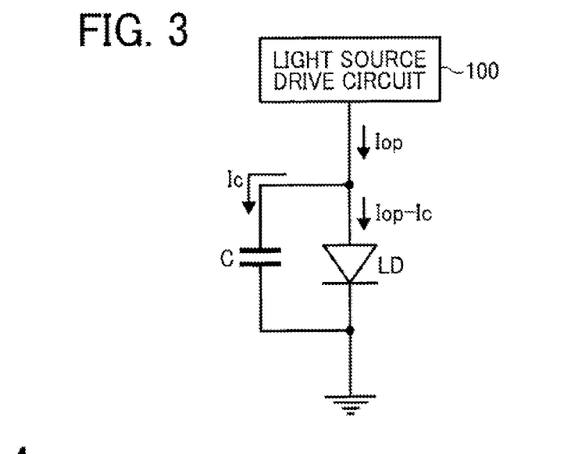
FIG. 3 is a diagram illustrating a parasitic capacitance of a laser diode and a driver device.
Figure 4:
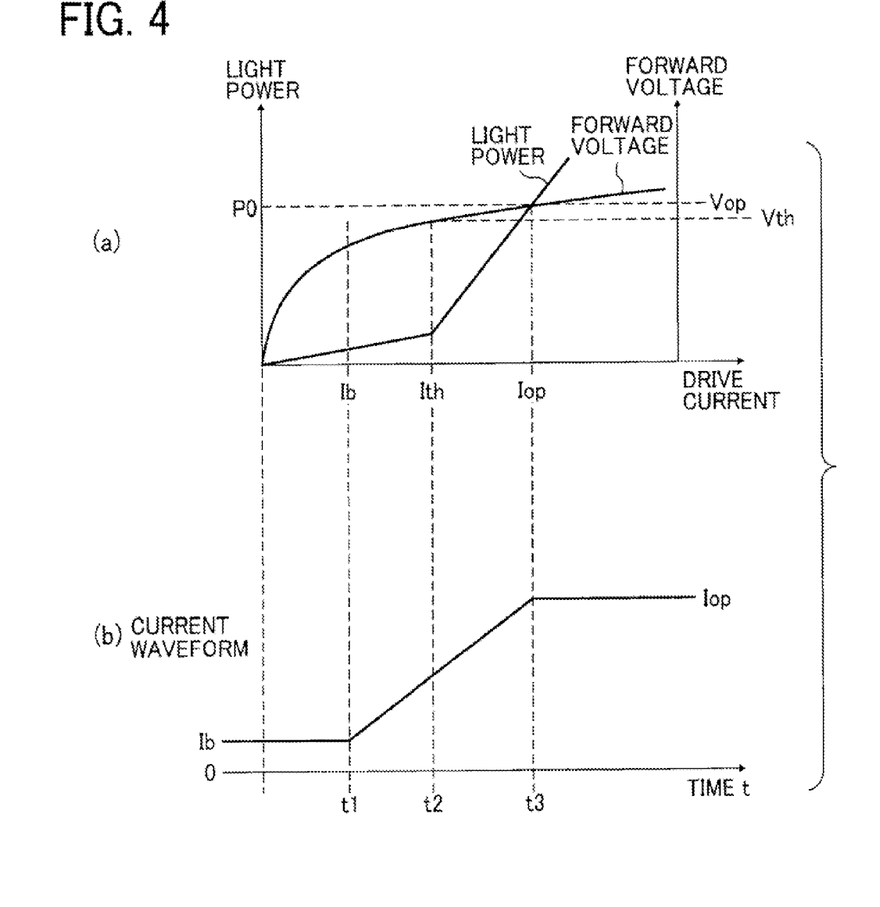
FIG. 4 is a diagram illustrating a relationship between a drive current and a response time of the laser diode.
Figure 5A:
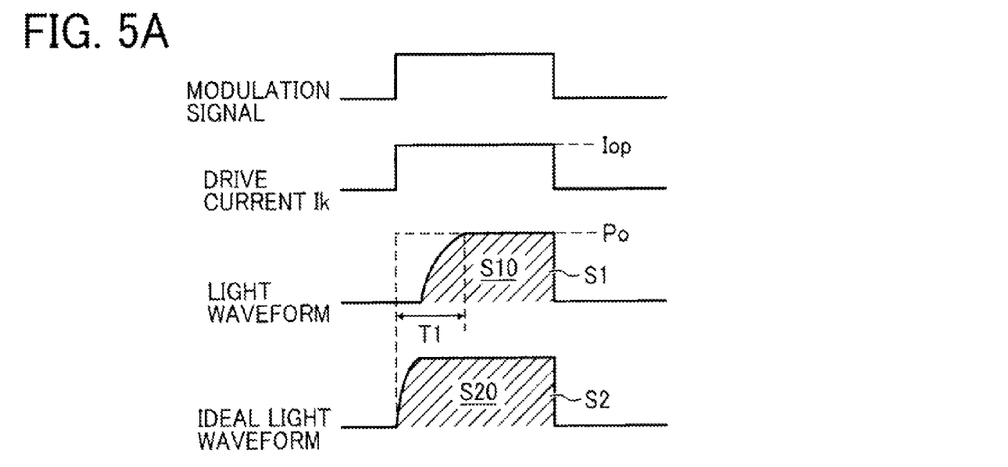
FIGS. 5A to 5C are diagrams illustrating a delay of light output of the light source drive circuit of the first embodiment.
Figure 5B:
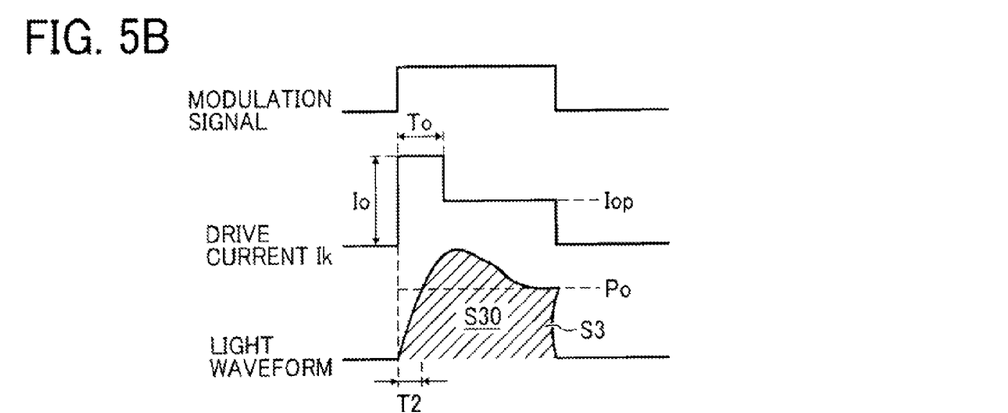
Figure 5C:
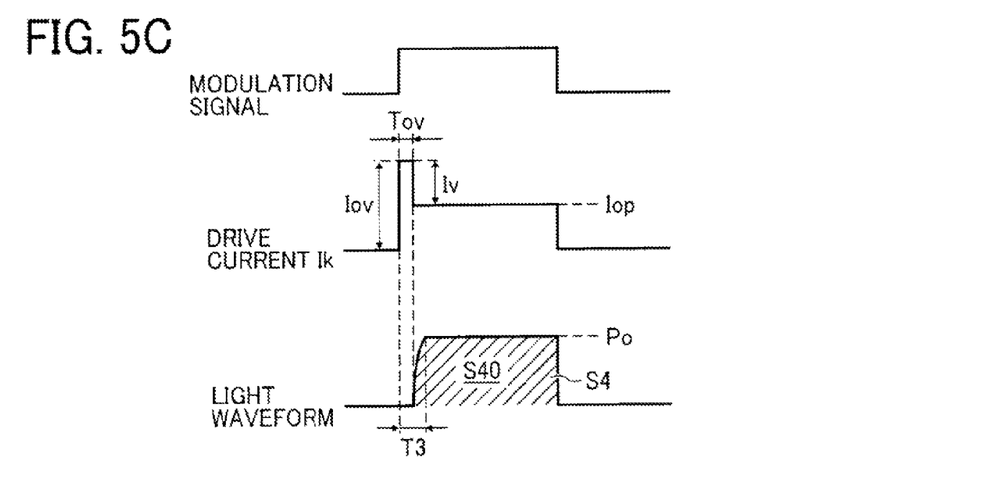

Next, a delay of light output in a light source drive circuit is described referring to FIG. 3 to FIG. 5. The first embodiment may reduce the delay of light output by an overshoot of the drive current.

Here, in the light source drive circuit 100 of the first embodiment, the delay of light output means the time between when the LD driver 200 starts providing the drive current to the LD and when the LD emits a laser light at a predetermined light power. The delay of light output includes two kinds of delays: 1) a delay while charging a parasitic capacitance existing between the LD and the LD driver 200, 2) a delay which derives from a response of the LD from between when the drive current is provided to the LD and when the LD emits a laser light at a predetermined light power. The response of the LD depends on the properties of the LD. Hereinafter, light output means the LD emits a laser light at a predetermined light power.

First, the delay while charging a parasitic capacitance is explained referring to FIG. 3. A parasitic capacitance C may exist at the LD and the LD driver 200 as shown in FIG. 3. Specifically, when the LD and a circuit such as the LD driver 200 are, for example, mounted on a PCB (printed circuit board) in the first embodiment, a parasitic capacitance may exist at the lines or traces connecting the LD and the LD driver 200. When the LD and the LD driver 200 is in a package, a parasitic capacitance may exist within the package. FIG. 3 illustrates the parasitic capacitances described above as a parasitic capacitance C.

When a predetermined drive current Iop is provided to the LD when the parasitic capacitance C exists, a part of the predetermined drive current Ic is supplied to the parasitic capacitance C and the parasitic capacitance C is charged. Here, the predetermined drive current Iop corresponds to a drive current which the light source drive circuit 100 outputs as the predetermined light power. When the parasitic capacitance C is charged by Ic which is a part of the predetermined drive current Iop, the other part of the predetermined drive current (Iop-Ic) is supplied to the LD. After the parasitic capacitance C is fully charged, the predetermined drive current Iop is supplied in full to the LD. Therefore, when the part of the predetermined drive current Ic is supplied to the parasitic capacitance C and the parasitic capacitance C is charged, the other part of the predetermined drive current (Iop-Ic) is supplied to the LD and the LD does not output the predetermined light power.

Next, the delay, which results from a response of the LD from when the drive current is provided to the LD to when the LD emits a laser light at a predetermined light power, is explained. FIG. 4 illustrates a response of the LD when the drive current is applied. Portion (a) of FIG. 4, referred to as FIG. 4(a), illustrates a relationship between a drive current and a light power, a forward voltage of the LD. Portion (b) of FIG. 4, referred to as FIG. 4(b), illustrates a current waveform of the drive current.

The light power of the LD is detected by the PD. As shown in FIG. 4(a), when the drive current becomes a threshold current Ith, a light emission of the LD occurs. When the drive current becomes the predetermined drive current Iop, the LD outputs the predetermined light power PO. The predetermined drive current Iop may be determined according to a property of the LD. In the present embodiment, a response of the LD is defined as a time (t3−t1), between when the drive current is provided to the LD (t1) and when the LD emits a laser light at the predetermined light power PO (t3). A bias current Ib illustrated in FIGS. 4(a) and 4(b) is explained below.

FIGS. 5A-5C illustrate a delay of light output and a light waveform of the LD. FIG. 5A illustrates a case in which a drive current Ik has no overshoot. FIG. 5B illustrates a case in which a drive current Ik has a conventional overshoot. FIG. 5C illustrates a case in which a drive current Ik has an overshoot in the present embodiment. The modulation signal controls the on/off timing of a drive current Ik which is applied to the LD. A light waveform, which includes a delay of light output, is a light waveform of the LD corresponding to the applied drive current Ik.

In FIG. 5A, a delay of light output is T1, which corresponds to a time between when the drive current Ik rises and when the light output reaches the predetermined light power Po. An integrated light power which integrates the light waveform is S10 (an area of S1). Further, FIG. 5A illustrates an ideal light waveform which has no delay of light output corresponding to the drive current Ik, for comparison. An integrated light power which integrates the ideal light waveform is S20 (an area of S2). Because of the delay of light output T1, S10 is smaller than S20.

In FIG. 5B, the drive current Ik has an overshoot, which starts at a rising point of the drive current Ik and ends after the time T0. The current value during the overshoot is Io and is larger than the predetermined drive current Iop. A delay of light output is T2, which corresponds to a time between when the drive current Ik rises and when the light output reaches the predetermined light power Po. In FIG. 5B, because of the overshoot current Io, the delay of light output T2 becomes smaller than T1, which is the case without overshoot shown in FIG. 5A.

In FIG. 5B, an integrated light power which integrates the light waveform is S30 (an area of S3). Here, S30 is larger than S20. It shows that a larger drive current is supplied to the LD because of the overshoot. According to FIG. 5B, the delay of light output may be reduced. However, the light source may be damaged by being provided the overshot drive current.

In FIG. 5C, according to the present embodiment, the drive current Ik has an overshoot such that an integrated light power which integrates the light waveform is S40 (an area of S4) which is close to S20, an ideal light waveform.

According to the present embodiment of FIG. 5C, the light source drive circuit 100 controls the drive current Ik having the overshoot, which has a startpoint which is a rising point of the drive current Ik and has an end point which is at the expiration of the overshoot time Tov. In other words, the overshoot current Iov is applied until a light emission of the LD is detected. The overshoot time Tov is shorter than the term between when the drive current Ik rises and when a light emission of the LD is detected.

In the present embodiment, the parasitic capacitance C may be charged in short term by the drive current Ik having the overshoot. Thus, the delay of light output while charging a parasitic capacitance may be reduced. Therefore, the delay of light output may be close to a delay which derives from a response of the LD. The delay which derives from a response of the LD corresponds to a time between when the drive current is provided to the LD and when the LD emits a laser light at a predetermined light power. Further, since the current value of the drive current Ik after the overshoot is the predetermined drive current Iop, the LD is not damaged by applying a larger drive current. Since the overshoot time Tcv finishes before a light output of the LD is detected, the integrated light power (S40 in FIG. 5C) which integrates the light waveform may be close to the integrated light power (S20 in FIG. 5A) which integrates the ideal light waveform.

Here, an overshoot current Iv is defined as a current which the drive current is overshot from the predetermined drive current Iop. In FIG. 5C, the overshoot current Iv corresponds to Iov-Iop.

Based on the present embodiment, when the parasitic capacitance C becomes larger, the delay of light output may be reduced. The light sources having a larger parasitic capacitance may be a laser diode in red (about 700 nm wavelength) or a VCSEL (vertical cavity surface emitting laser), for example.

Referring to FIG. 2, controlling the drive current Ik by the light source drive circuit 100 is described.

The light source drive circuit 100 controls the drive current Ik by the CPU 110 and the LD driver 200. Specifically, the light source drive circuit 100 determines the overshoot time Tov and the overshoot current Iv.

The LD driver 200 according to the present embodiment includes an LD interface 210, a bias current source 220, a modulation current source 230, an overshoot current source 240, a first switch 250 and a second switch 260. The LD interface 210 provides a modulation signal and an overshoot signal based on commands from the CPU 110.

The bias current source 220, the modulation current source 230 and the overshoot current source 240 constitute drive current sources of the drive current Ik. The drive current Ik is generated by a combination of these currents of the current sources.

The bias current source 220 generates a bias current Ib. The bias current Ib causes a forward voltage on the LD. The modulation current source 230 generates a modulation current Ih based on the commands from the CPU 110. The modulation current source 230 is connected with the LD via the first switch 250. The modulation signal from the LD interface 210 controls on/off of the first switch 250. The first switch 250 is constituted by a transistor, for example. The modulation current Ih is determined by the CPU 110.

The overshoot current source 240 generates an overshoot current Iv. The overshoot current Iv is applied to the LD synchronized with when the modulation signal rises up. The overshoot current source 240 is connected to the LD via the second switch 260. The overshoot signal from the LD interface 210 controls on/off of the second switch 260. The second switch 260 is turned on for a period of the overshoot time Tov when the modulation signal rises up.

Next, the LD interface 210 is explained. The LD interface 210 includes a selector 211 and an emission pattern memory 212.

The selector 211 selects either one of the light emitting signal input to the LD driver 200 or an emission pattern signal, as the modulation signal, based on the command of the CPU 110. The emission pattern memory 212 stores the emission pattern signal, which is used when the overshoot current Iv is determined.

Figure 6:
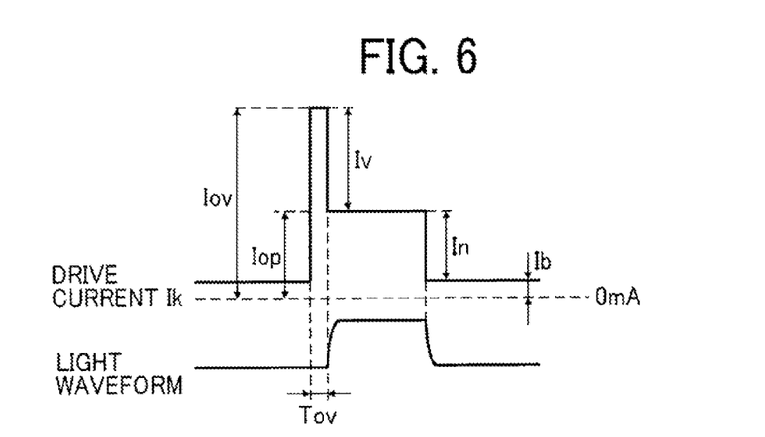
FIG. 6 is a diagram illustrating a drive current of the light source drive circuit the first embodiment.

FIG. 6 illustrates a drive current Ik which the light source drive circuit 100 of the present invention provides to the LD.

Referring to FIG. 6, the drive current Ik is a summation of the bias current Ib, the modulation current Ih and the overshoot current Iv. The predetermined drive current Iop corresponds to a summation of the bias current Ib and the modulation current Ih. The bias current Ib is a current to reduce a response time of the LD because the bias current Ib causes a forward voltage. Since the bias current Ib always flows in this particular embodiment, although it is possible not to flow in other implementations, the delay of light output may be reduced. The bias current Ib is determined to be certain value, for example 1 mA. It is desirable that the bias current Ib is smaller than the threshold current Ith.

The modulation current Ih is supplied to the LD according to the on/off state of the first switch 250, which is controlled by the modulation signal. The modulation current Ih is determined so that a summation of the modulation current Ih and the bias current Ib is equal to the predetermined drive current Iop.

The overshoot current Iv is supplied according to the on/off state of the second switch 260, which is controlled by the overshoot signal. The overshoot signal corresponds to a pulse signal which is selected by the selector 160 based on the command of the CPU 110. The overshoot time Tov is determined by a pulse width of the overshoot signal.

The CPU 110 of the light source drive circuit determines the overshoot time Tov and the overshoot current Iov. The CPU 100 can be implemented by any processor which is defined to include a circuit, integrated circuit, application specific integrated circuit or microprocessor, for example. The overshoot time Tov is determined as a period between when the drive current Ik is provided to the LD and when the LD emits a light emission. The overshoot current Iv is determined as a current which a light waveform is close to the ideal light waveform without a delay (referring FIG. 5A).

Figure 7:
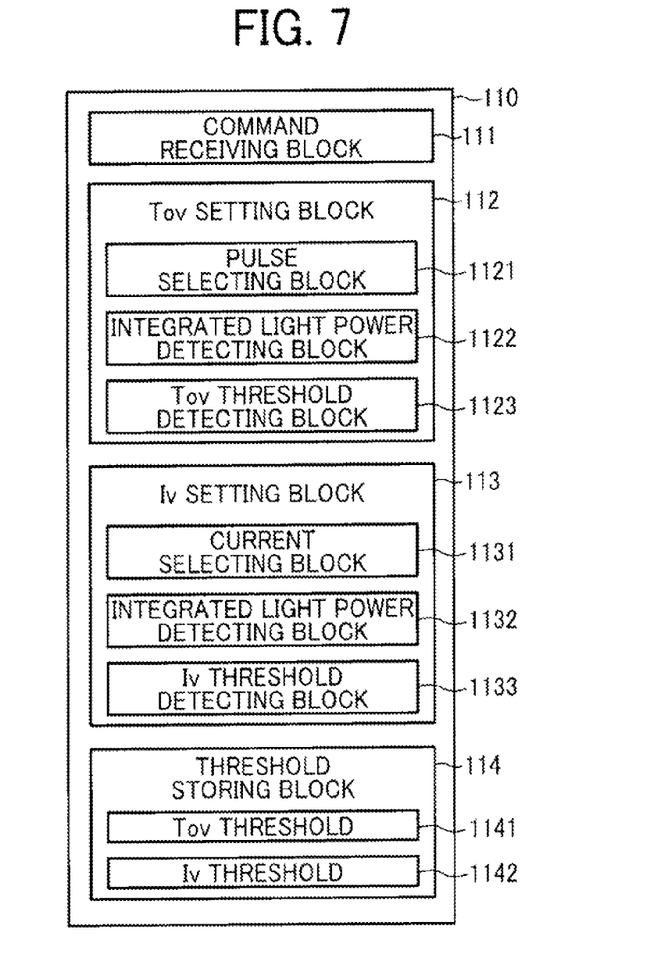
FIG. 7 is a schematic diagram illustrating functions of the CPU in the light source drive circuit of the first embodiment.

FIG. 7 illustrates functions of the CPU 110 in the light source drive circuit 100 of the present embodiment. These functions are illustrated as blocks which may be implemented as software routines or functionality achieved by any type of circuit, including a processor which is a type of circuit.

The CPU 110 of the present embodiment includes a command receiving block 111, a Tov setting block 112, an Iv setting block 113 and a threshold storing block 114. The command receiving block 111 receives a command to set the overshoot time Tov and the overshoot current Iv from the image forming apparatus 10. In the present embodiment, the command receiving block 111 receives the command after the light source drive circuit 100 stops the drive current Ik to the LD. A main CPU in the image forming apparatus, which controls operations of the image forming apparatus 10, may provide the command to the CPU 110. Specifically, the command receiving block 111 receives the command when the image forming apparatus 10 starts from a sleep mode or when the image forming apparatus 10 is reset. The image forming apparatus 10 is reset when a door of the image forming apparatus 10 is opened and closed.

The Tov setting block 112 includes a pulse selecting block 1121, an integrated light power detecting block 1122 and a Tov threshold detecting block 1123. The Tov setting block 112 calculates and sets the overshoot time Tov. The Iv setting block 113 includes a current selecting block 1131, an integrated light power detecting block 1132 and an Iv threshold detecting block 1133. The Iv setting block 113 calculates and sets the overshoot current Iv. The threshold storing block 114 includes a Tov threshold 1141 used by the Tov setting block 112 and an Iv threshold 1142 used by the Iv setting block 113.

The Tov threshold 1141 is a threshold to determine whether the light emission of the LD is detected or not. The Iv threshold 1142 is a threshold to determine whether the integrated light power reached the predetermined valued or not.

Figure 8:
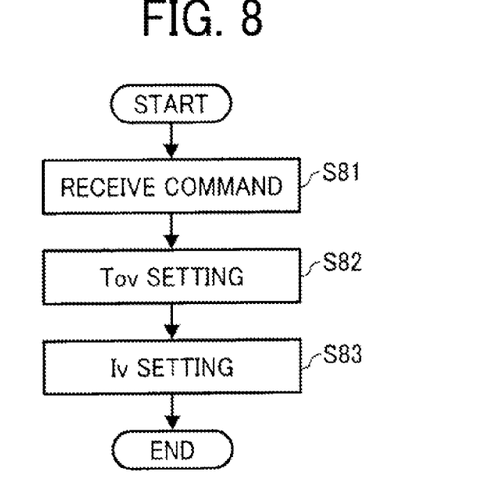
FIG. 8 is a flowchart illustrating a process for the CPU in the light source drive circuit of the first embodiment.

FIG. 8 is a flowchart of the present embodiment illustrating a process which the CPU 110 sets the overshoot time Tov and the overshoot current Iv.

The command receiving block 111 in the CPU 110 receives the command to set the overshoot time Tov and the overshoot current Iv from the main CPU in the image forming apparatus (step S81). The Tov setting block 112 sets the overshoot time Tov (step S82). Next, the Iv setting block 113 sets the overshoot current Iv (step S83).

Thus, the CPU 110 of the present embodiment sets the overshoot time Tov first, then sets the overshoot current Iv, according to one exemplary implementation.

Figure 9:
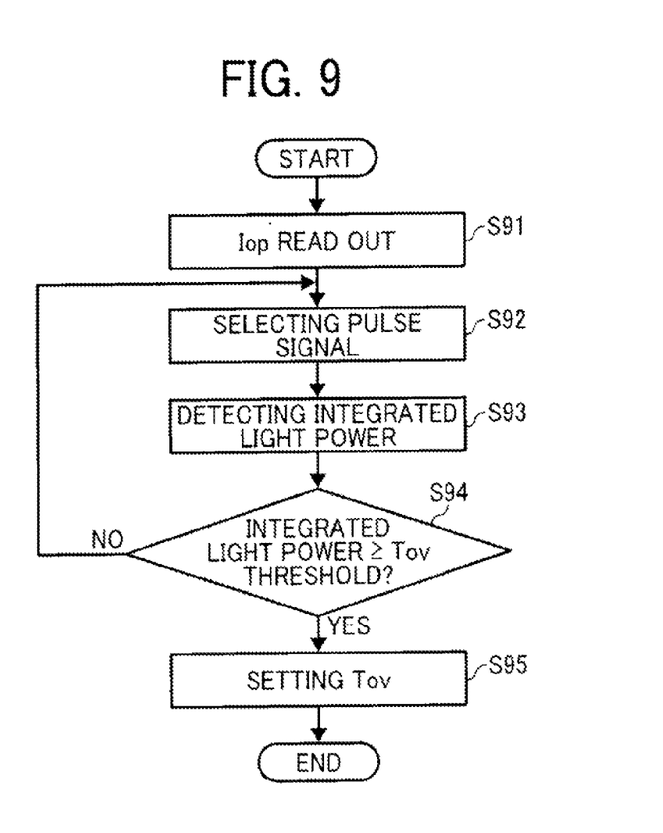
FIG. 9 is a flowchart illustrating a process for setting a Tov of the first embodiment.

Next, FIG. 9 is a flowchart of the present embodiment illustrating a process in which the Tov setting block 112 sets the overshoot time Tov.

The Tov setting block 112 determines the overshoot time Tov as a time, which starts when the Tov setting block 112 provides the predetermined drive current Iop to the LD and ends before the PD detects the light emission of the LD.

When the command receiving block 111 receives a setting command from the main CPU of the image forming apparatus 10, the Tov setting block 112 reads the predetermined current Iop from the memory 120. The Tov setting block 112 makes the overshoot current source 240 to output the predetermined current Iop via the DAC 130 (step S91). In this process, the bias current source Ib and the modulation current source Ih turn off. Therefore, only the overshoot current source 240 provides the predetermined drive current Iop to the LD.

The pulse selecting block 1121 outputs a pulse selecting signal to the selector 160 (step S92). The pulse selecting block 1121 outputs the pulse selecting signal from a smaller pulse width to a wider pulse width one by one.

The selector 160 outputs an overshoot signal to the second switch 260 according to the pulse selecting signal. The second switch 260 turns on and the predetermined drive current Iop to the LD is provided while the overshoot signal exists.

The integrated light power detecting block 1122 detects the light emission of the LD (step S93). The light emission of the LD is received by the PD. An output of the PD is integrated by the LPF 140. The ADC 150 coverts a signal output from the LPF 140 to the digital signal, which corresponds to a light emission of the LD.

The Tov threshold detecting block 1123 judges the integrated light output (the digital signal above) is equal to or more than a Tov threshold, which is stored in the threshold storing block 114 (step S94). When the integrated light output is equal to or more than the Tov threshold, the Tov threshold detecting block 1123 judges that a light emission of the LD is detected. Then, the Tov setting block 112 sets a pulse width to be a value which was used immediately preceeding the previous time step S94 was executed, as an overshoot time Tov (step S95). For example, in FIG. 10, if the light was detected for FIG. 10(3), the pulse width P2 would be selected as it is immediately preceding the pulse width P3 in FIG. 10(3).

When the integrated light output is less than the Tov threshold, the flowchart proceeds back to the step S92. The Tov setting block 112 selects a next pulse which has a wider pulse width than the pulse selected currently.

Figure 10:
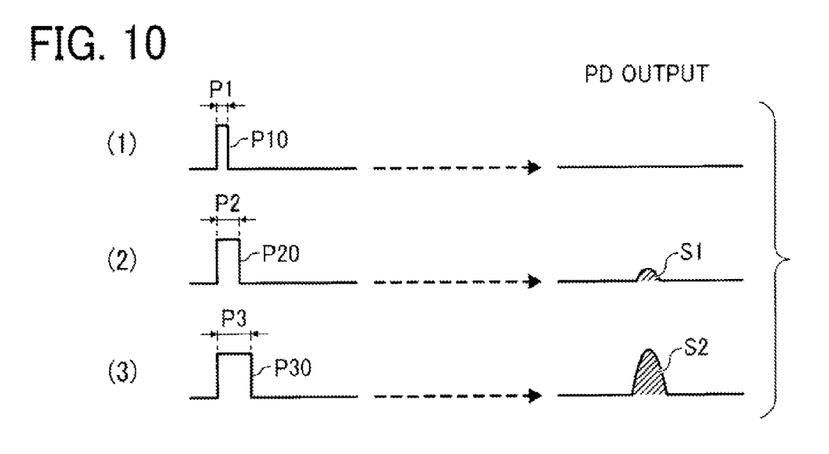
FIG. 10 is a diagram illustrating an overshoot time.

FIG. 10 illustrates setting the overshoot time Tov. FIG. 10 shows an output waveform of the PD as a pulse width of the overshoot signal from the selector 160 increases step by step. Here, the output waveform of the PD is converted to a voltage value by the resistor R1 of FIG. 2 and is provided to the LPF 140.

FIG. 10(1) illustrates an output waveform of the PD when a pulse signal P10 is applied to the LD. The pulse signal P10 is selected at first in the selector 160 and has the smallest pulse width among the pulse signals. The pulse width of the pulse signal P10 is P1. The output waveform of the PD does not appear and an output of the LPF 140 which is an integration of the light output is zero. Thus, the LD does not emit light.

FIG. 10(2) illustrates an output waveform of the PD when a pulse signal P20 is applied to the LD. The pulse signal P20 has pulse width of P2. The output waveform of the PD appears briefly and an output of the LPF 140 is S1.

FIG. 10(3) illustrates an output of the PD when a pulse signal P30 is applied to the LD. The pulse signal P30 has pulse width of P3. The output waveform of the PD appears briefly and an output of the LPF 140 is S2.

According to the present embodiment, a pulse width of a pulse signal which is applied to the LD increases step by step. When an output of the PD is equal to or more than the Tov threshold, the Tov threshold detecting block 1123 detects a light emission of the LD.

The Tov threshold is a proportion of a full integrated light output to a pulse integrated light output. The full integrated light output corresponds to an integrated output of the PD when the LD emits at light output Po continuously. The pulse integrated light output corresponds to an integrated output of the PD when the LD emits according to an applied pulse signal. In the present embodiment, the Tov threshold may be set to several %, for example 5%. When the pulse integrated output of the PD is equal to or more than 5% of the full integrated light output, the Tov threshold detecting block 1123 detects a light emission of the LD.

In FIG. 10, S1 is about 3% of the full integrated light output and S2 is about 10% of the full integrated light output, for example. These values of 3% and 10% can be higher or lower, depending on the characteristics of the LD, for example. Thus, the Tov setting block 112 sets the pulse width of P2 as the overshoot time Tov.

In other words, the Tov setting block 112 determines the overshoot time Tov as a time which starts when the predetermined drive current is provided to the LD and ends before the PD detects the light emission of the LD.

In the above description, the Tov setting block 112 sets a pulse width, which is selected just before the pulse width when an integrated light output is equal to or larger than the Tov threshold, as an overshoot time Tov. Alternatively, the Tov setting block 112 may set any other pulse width, which is smaller than the pulse width when an integrated light output is equal to or larger than the Tov threshold, as an overshoot time Tov.

Figure 11:
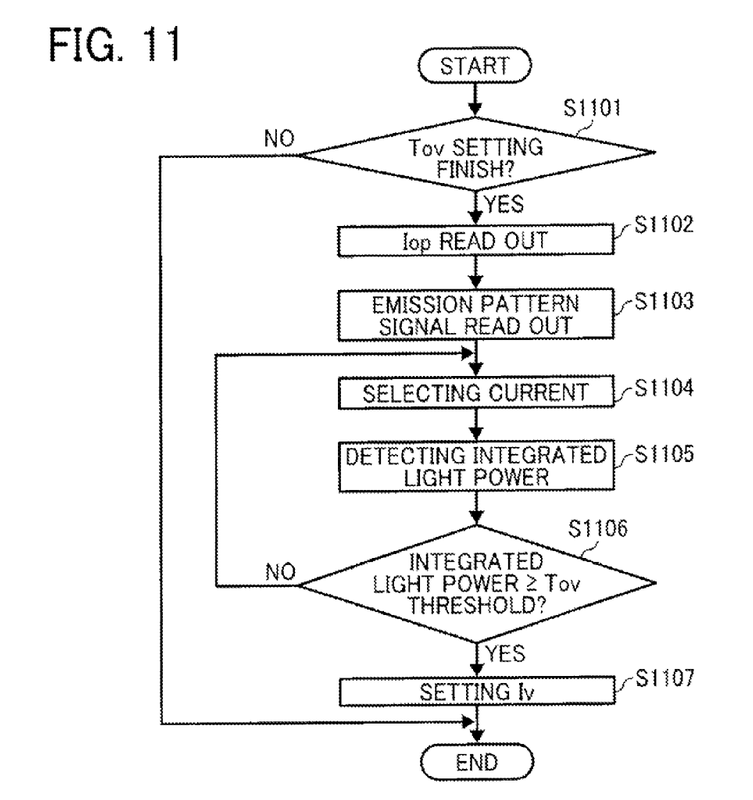
FIG. 11 is a flowchart illustrating a process for setting the a Iv of the first embodiment.

Next, FIG. 11 is a flowchart of the present embodiment illustrating a process which the Iv setting block 113 sets an overshoot current Iv.

The Iv setting block 113 sets a current as the overshoot current Iv, which results in an integrated light output from the PD being equal to or larger than an Iv threshold when the LD emits based on an emitting pattern.

The Iv threshold is a proportion of an ideal integrated light output to an integrated light output of the PD: The ideal integrated light output corresponds to an integrated output when the LD emits based on an emission pattern without any delay. The integrated light output corresponds to an integrated output of the PD when the LD actually emits.

First, the Iv setting block 113 checks whether the Tov setting block 112 finishes setting the overshoot time Tov (step S1101). If the overshoot time Tov is set in step S1101, the Iv setting block 113 reads the predetermined drive current Iop from the memory 120 (step S1102). In the present embodiment, the predetermined drive current Iop is equal to a summation of the modulation current Ih and the bias current Ib. The CPU 110 controls the modulation current source 230 to set a current value.

The Iv setting block 113 provides a command, which the selector 211 in the LD driver 200 reads and selects an emission pattern signal from the emission pattern memory 212 (step S1103). When the selector 211 selects the emission pattern signal, the emission pattern signal is applied to the first switch 250. In the present embodiment, the emission pattern signal causes the LD to turn on for one pixel and the LD to turn off for one pixel over and over again.

The current setting block 1131 in the Iv setting block 113 causes the outputting of a current selecting signal to the DAC 130 (step S1104). The current setting block 1131 further causes a selection from a smaller current from among the currents being available for the DAC 130.

The DAC 130 converts the current selecting signal and provides a current value to the overshoot current source 240. The overshoot current source 240 provides a current to the LD. The second switch 260 is controlled by an overshoot signal synchronized with the emission pattern signal. The second switch 260 is turned on by the overshoot signal for a period of the overshoot time Tov, which is set by the Tov setting block 112.

The Iv setting block 113 is used to check an integrated light output of the PD is equal to or larger than the Iv threshold by the integrated light power detecting block 1132 (step S1106). When the integrated light output of the PD is equal to or larger than the Iv threshold in step S1106, the Iv setting block 113 is used to set the current as the overshoot current Iv (step S1107). When the integrated light output of the PD is less than the Iv threshold in step S1106, the flowchart proceeds to step S1104 and the Iv setting block 113 is used to select a next larger current value.

Figure 12:
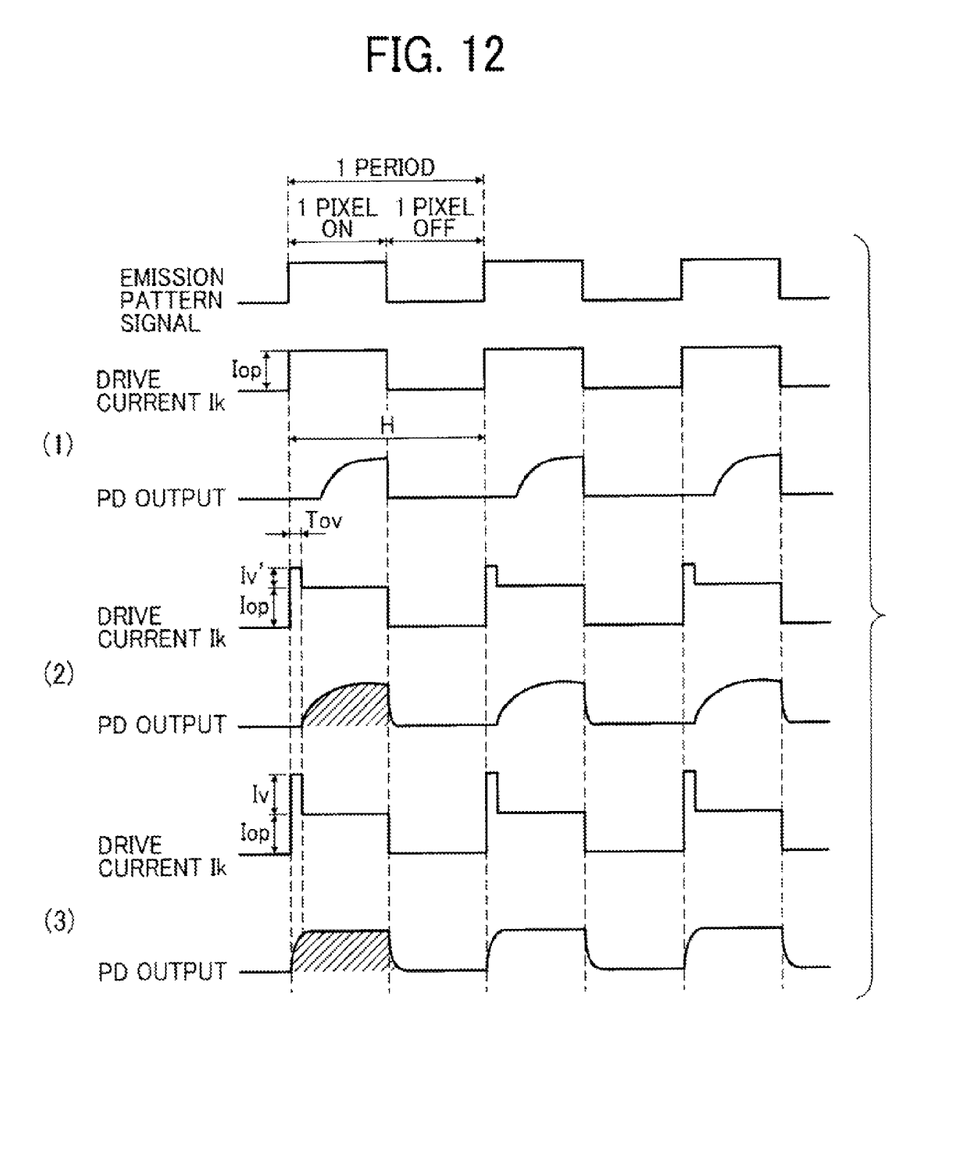
FIG. 12 is a diagram illustrating an overshoot current.

Further, the overshoot current Iv is explained referring to FIG. 12.

FIG. 12, which contains sections (1), (2), and (3) which are referred to as FIGS. 12(1), 12(2), and 12(3), shows a case which the Iv threshold is 50% in order to obtain an ideal light waveform without a delay of light output.

In FIG. 12(1), the current selecting block 1131 does not select an overshoot current Iv. The drive current Ik becomes the predetermined drive current Iop and is synchronized with the emission pattern signal. The emission pattern signal repeats one cycle H, which the LD turns on for one pixel and the LD turns off for one pixel. In this case, an integrated light output of the PD may become less than 50%.

In FIG. 12(2), the current selecting block 1131 selects an overshoot current Iv', which is the smallest value of an overshoot current being available. The drive current Ik has an overshoot current Iv' at the rising edge. The overshoot current Iv' continues for a period of the overshoot time Tov. In this case, an integrated light output of the PD still may become less than 50%.

In FIG. 12(3), the current selecting block 1131 selects an overshoot current Iv, which is larger than the overshoot current Iv'. The drive current Ik has an overshoot current Iv at rising edge. The overshoot current Iv continues for a period of the overshoot time Tov. In this case, an integrated light output of the PD may become equal to or larger than 50%. Therefore, the current selecting block 1131 sets a value of the overshoot current Iv.

According to the present embodiment, the Tov setting block 112 is used to detect a time between when the drive current Ik rises and when the LD emits light. The Tov setting block 112 determines an overshoot time Tov, which is shorter than the time between when the drive current Iv rises and when the LD emits light. Further, the Iv setting block 113 determines the overshoot current Iv based on the Iv threshold. The Iv threshold is determined so that an output of the PD may be close to an ideal output of the PD when the LD has no delay of light output.

In the present embodiment, the drive current Ik has the overshoot current Iv for a period of the overshoot time Tov. Therefore, a parasitic capacitance may be charged in a short time and the predetermined drive current Iop is provided to the LD after the LD starts emitting. The present embodiment may prevent the light source from being damaged and improve the response time of the light output.

The present embodiment includes calculations for both an overshoot time Tov and an overshoot current Iv. Alternatively, either one of an overshoot time Tov and an overshoot current Iv may have a default value and be stored in the memory 120 so that only one of the overshoot time Tov and the overshoot current Iv is calculated/determined.

Second Embodiment

The second embodiment of the present invention includes plural LDs as compared to the first embodiment. The second embodiment is explained in view of difference from the first embodiment. When a component is common with the first embodiment, the component has the same reference number as the first embodiment.

Figure 13:
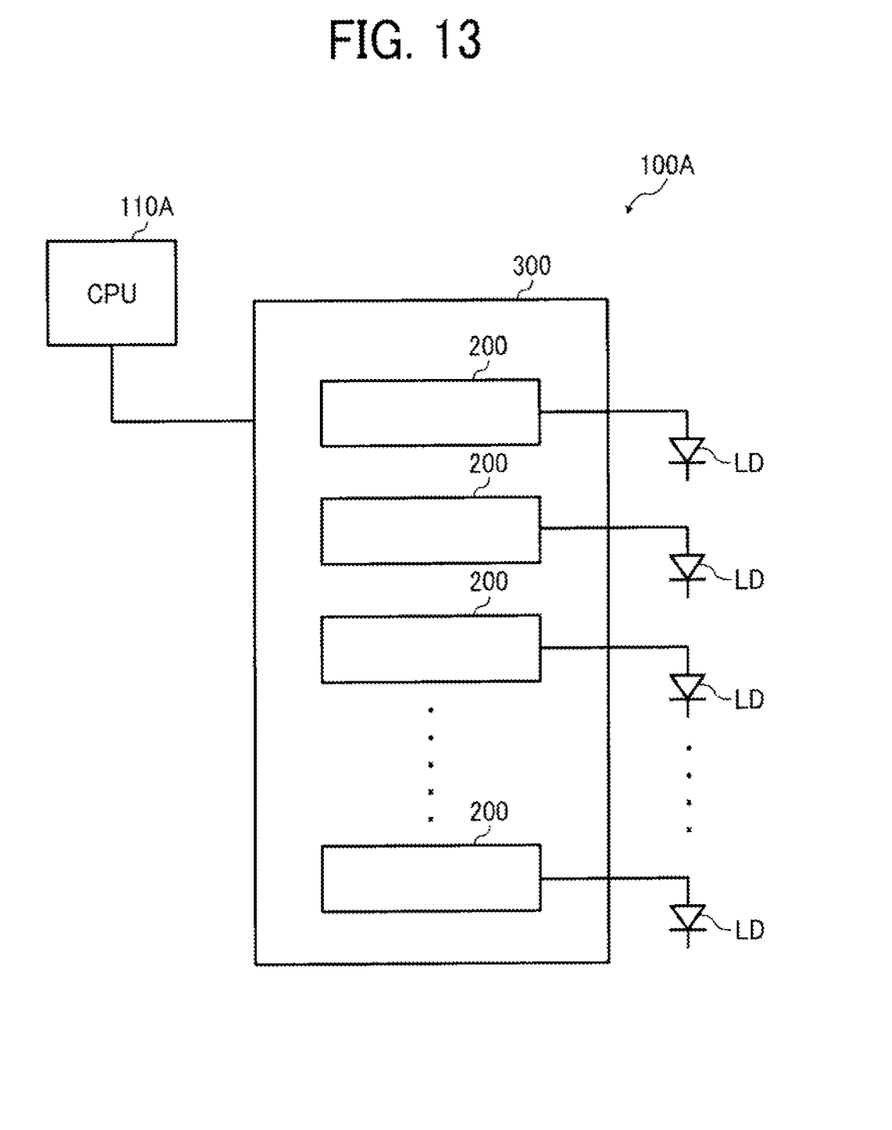
FIG. 13 is a schematic diagram illustrating a light source drive circuit of the second embodiment.

FIG. 13 is a schematic diagram illustrating a light source drive circuit 100A of the second embodiment. The light source drive circuit 100A includes plural LDs and an LD driver IC 300. The LD driver IC 300 includes plural LD drivers 200, which are provided for each plural LDs, respectively.

The CPU 110A and the LD driver IC 300 performs a similar process as in the first embodiment and sets an overshoot time Tov and an overshoot current Iv as same as, for the respective LD.

Figure 14:
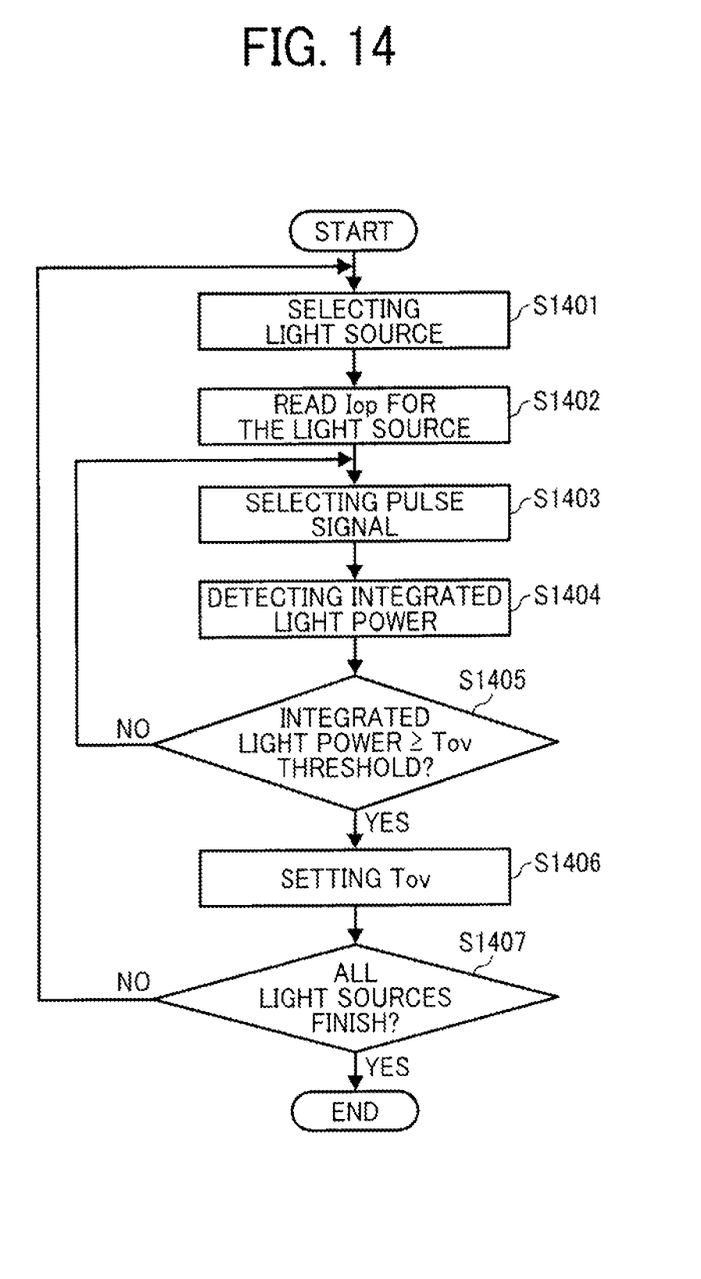
FIG. 14 is a flowchart illustrating a process for setting a Tov in the CPU of the second embodiment.

FIG. 14 is a flowchart illustrating a process of the Tov setting block of the second embodiment. The CPU 110A selects one LD light source, which will receive an overshoot current Iv, among the plural LDs (step S1401). The CPU 110A reads a predetermined drive current Iop, which corresponds to the selected LD, from the memory 120A (step S1402). The memory 120A of the second embodiment may store items including plural predetermined drive currents corresponding to the plural LDs, respectively.

The process from the step S1403 to the step S1406 is same as from the step S92 to the step S95 in FIG. 9.

The CPU 110A checks whether the overshoot time Tov has been set for each of the LDs (step S1407). When the overshoot time Tov has been determined to be set for each of the LDs in step S1407, the process flow ends. When the overshoot time Tov has been determined to be set for each of the LDs in step S1407, the process flow proceeds back to step S1401.

Figure 15:
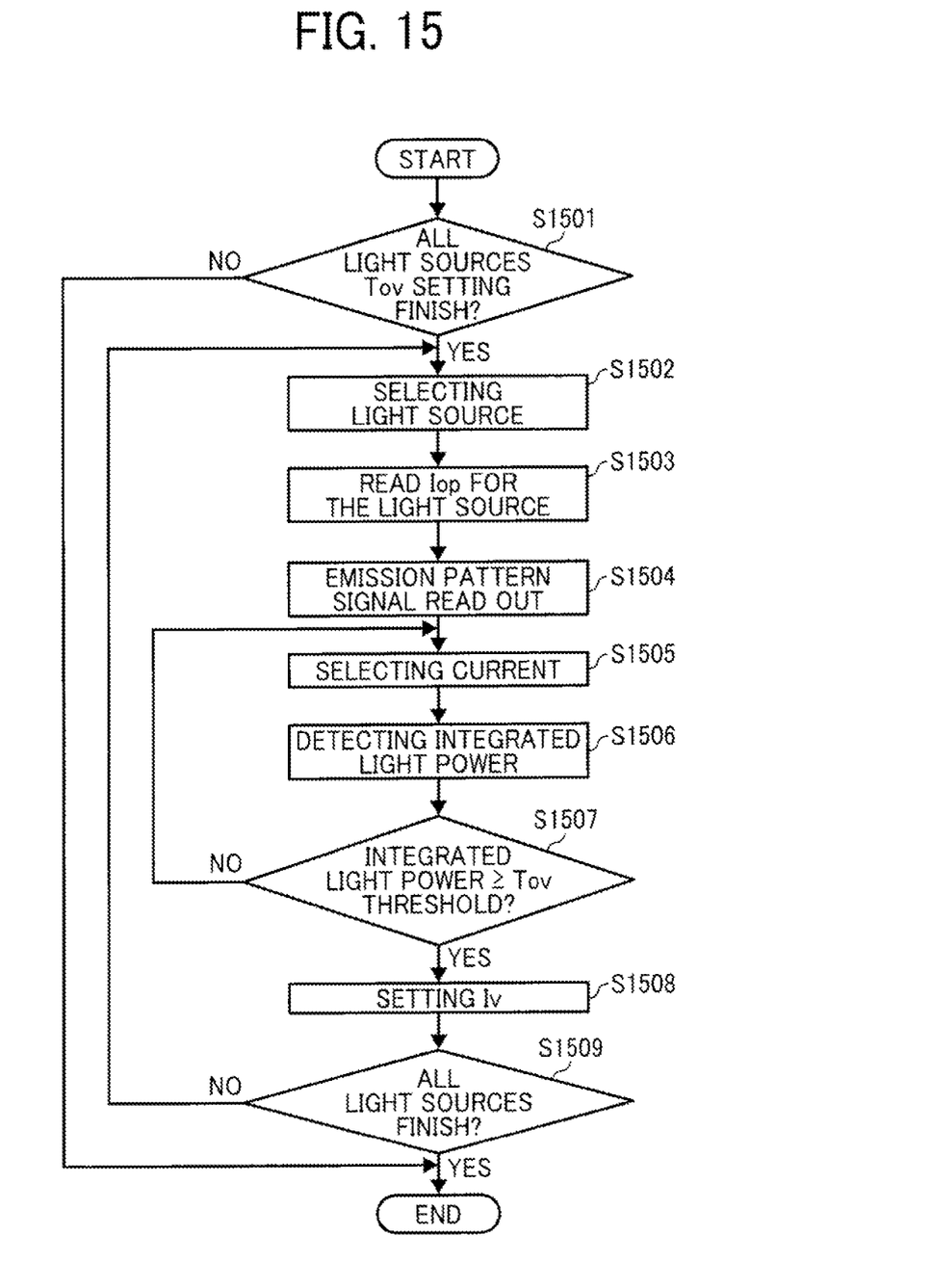
FIG. 15 is a flowchart illustrating a process of the Iv setting block of the second embodiment.

FIG. 15 is a flowchart illustrating a process of the Iv setting block of the second embodiment.

The CPU 110A checks whether the overshoot time Tov has been set for all LDs (step S1501). When the overshoot time Tov is determined to be set for all LDs in step S1501, the CPU 110A selects one LD from among the plural LDs (step S1502). The CPU 110A reads a predetermined drive current Iop, which corresponds to the selected LD, from the memory 120A (step S1503).

The process from step S1404 to step S1508 is the same as step S1103 to step S1107 in FIG. 11.

The CPU 110A checks that the overshoot current Iv is set for all of the LDs (step S1509). When the overshoot current Iv is determined to be set for all light sources in step S1509, the process ends. When the overshoot current Iv is determined not to be set for all LDs in step S1509, flow proceeds to step S1502.

According to the second embodiment, the light source drive circuit 100A, which drives the plural LDs, may prevent the light source from being damaged and improve the response of light output.

Although the present invention has been described with respect to specific embodiments for a clear disclosure, the claims are not limited but are construed as embodying all modifications and alternative constructions that may occur to one skilled in the art.

What is claimed is:

1. A light source drive device, comprising:
 a first current source which provides a predetermined current to a light source corresponding to a predetermined light output;
 a second current source which provides an overshoot current to the light source synchronized with the predetermined current of the first current source, the overshoot current being an additional current which increases the current applied to the light source; and
 a processor configured to perform:
  setting an overshoot time during which the overshoot current is applied to the light source; and
  setting an overshoot current which is applied to the light source,
 wherein the overshoot time is set so that the overshoot time is smaller than a time period from the rising of the predetermined current to when a light emission of the light source is detected,
 wherein the light source drive device further includes:
 a light detector which receives emitted light from the light source and outputs a signal corresponding to an amount of the emitted light; and
 an integrator which integrates the signal output from the light detector,
 wherein the setting of the overshoot time detects the light emission when an integrated value obtained by the integrator becomes equal to or larger than an overshoot time threshold.

2. The light source drive device as claimed in claim 1, wherein the setting of the overshoot current sets the overshoot current, after the overshoot time is set.

3. The light source drive device as claimed in claim 1, further comprising:
 a pulse generator which outputs a selected pulse signal among plural pulse signals having different pulse width and drives the second current source based on the selected pulse signal,
 wherein the setting of the overshoot time includes selecting one of the plural pulse signals in an order starting with a smaller pulse width, and
 the setting of the overshoot time sets the overshoot time so that the overshoot time corresponds to a pulse signal whose pulse width is smaller than a pulse signal which causes a detection of the emitted light.

4. The light source drive device as claimed in claim 1 further comprising:
 a memory which stores an emission pattern to drive the first current source providing the predetermined current to the light source,
 wherein
 the setting of the overshoot current includes selecting an overshoot current added to the predetermined current, in an order beginning with a smaller current value, and
 the setting of the overshoot current sets the overshoot current when the integrated value obtained by the integrator becomes equal to or larger than a overshoot current threshold, as the predetermined current and the overshoot current are applied to the light source.

5. An optical scanning device that scans a scan target surface with light, the optical scanning device comprising:
 a semiconductor laser;
 the light source drive device according to claim 1 that drives the semiconductor laser;
 a deflector that deflects light from the semiconductor laser; and
 a scanning optical system that collects light deflected by the deflector on the scan target surface.

6. An image forming apparatus comprising:
 at least one image carrier; and
 at least one optical scanning device according to claim 5 that scans the at least one image carrier with light modulated according to image information.

7. A light source drive device, comprising:
 a first current source which provides a predetermined current to a light source corresponding to a predetermined light output;
 a second current source which provides an overshoot current to the light source synchronized with the predetermined current of the first current source, the overshoot current being an additional current which increases the current applied to the light source;
 means for setting an overshoot time during which the overshoot current is applied to the light source; and
 means for setting an overshoot current which is applied to the light source,
 wherein the overshoot time is set so that the overshoot time is smaller than a time period from the rising of the predetermined current to when a light emission of the light source is detected,
 wherein the light source drive device further includes:
 a light detector which receives emitted light from the light source and outputs a signal corresponding to an amount of the emitted light; and
 an integrator which integrates the signal output from the light detector, wherein the means for setting of the overshoot time detects the light emission when an integrated value obtained by the integrator becomes equal to or larger than an overshoot time threshold.

8. The light source drive device as claimed in claim 7, wherein the means for setting of the overshoot current sets the overshoot current, after the overshoot time is set.

9. The light source drive device as claimed in claim 7, further comprising:
a pulse generator which outputs a selected pulse signal among plural pulse signals having different pulse width and drives the second current source based on the selected pulse signal,
wherein the means for setting of the overshoot time includes selecting one of the plural pulse signals in an order starting with a smaller pulse width, and
the means for setting of the overshoot time sets the overshoot time so that the overshoot time corresponds to a pulse signal whose pulse width is smaller than a pulse signal which causes a detection of the emitted light.

10. The light source drive device as claimed in claim 7, further comprising:
a memory which stores an emission pattern to drive the first current source providing the predetermined current to the light source,
wherein
the means for setting of the overshoot current includes selecting an overshoot current added to the predetermined current, in an order beginning with a smaller current value, and
the means for setting of the overshoot current sets the overshoot current when the integrated value obtained by the integrator becomes equal to or larger than a overshoot current threshold, as the predetermined current and the overshoot current are applied to the light source.

11. A method of driving a light source, comprising:
setting an overshoot time during which an overshoot current is applied to the light source;
setting an overshoot current which is applied to the light source so that the overshoot time is smaller than a time period from the rising of the predetermined current to when a light emission of the light source is detected;
providing a predetermined current to the light source corresponding to a predetermined light output;
providing the overshoot current to the light source for the overshoot time, synchronized with the predetermined current of the first current source, the overshoot current being an additional current which increases the current applied to the light source;
receiving emitted light from the light source and outputting a signal corresponding to an amount of the emitted light; and
integrating the output signal,
wherein the step of setting the overshoot time includes detecting the light emission when an integrated value obtained in the integrating step becomes equal to or larger than an overshoot time threshold.

* * * * *